US012055660B2

(12) United States Patent
Demers et al.

(10) Patent No.: US 12,055,660 B2
(45) Date of Patent: Aug. 6, 2024

(54) POLYGON SCANNING MIRROR FOR LIDAR BEAM SCANNING

(71) Applicant: GM Cruise Holdings LLC, San Francisco, CA (US)

(72) Inventors: Richard Demers, Moorpark, CA (US); George Keseyan, Los Angeles, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 427 days.

(21) Appl. No.: 16/877,899

(22) Filed: May 19, 2020

(65) Prior Publication Data

US 2021/0364605 A1 Nov. 25, 2021

(51) Int. Cl.
*G02B 5/09* (2006.01)
*G01S 7/481* (2006.01)
*G02B 26/12* (2006.01)

(52) U.S. Cl.
CPC .............. *G01S 7/4817* (2013.01); *G02B 5/09* (2013.01); *G02B 26/12* (2013.01)

(58) Field of Classification Search
CPC .................................. G02B 5/09; G02B 26/12
See application file for complete search history.

(56) References Cited

U.S. PATENT DOCUMENTS

| | | | | | |
|---|---|---|---|---|---|
| 5,033,807 A | * | 7/1991 | Menke | ................. | G02B 26/121 359/900 |
| 5,367,399 A | * | 11/1994 | Kramer | ................ | G02B 26/106 250/236 |
| 5,438,416 A | * | 8/1995 | Nater | ..................... | G02B 26/10 372/38.1 |
| 5,534,950 A | * | 7/1996 | Hargis | ................. | H04N 9/3132 348/E9.026 |
| 6,065,676 A | * | 5/2000 | Ring | ................... | G06K 7/10693 235/462.43 |
| 6,786,413 B2 | * | 9/2004 | Gurevich | ........... | G06K 7/10623 235/462.4 |
| 8,629,977 B2 | * | 1/2014 | Phillips | ................. | G01S 7/4817 356/3.01 |
| 9,001,312 B2 | * | 4/2015 | Matsubara | .............. | G01S 17/42 356/5.01 |
| 9,244,272 B2 | * | 1/2016 | Schultz | ................... | G01S 17/42 |
| 10,078,132 B2 | * | 9/2018 | Ishikawa | ............... | G01S 7/4817 |

(Continued)

FOREIGN PATENT DOCUMENTS

| | | | | | |
|---|---|---|---|---|---|
| AT | | 508562 B1 | * | 2/2011 | .......... G01C 15/002 |
| CN | | 1415994 A | * | 5/2003 | |

(Continued)

*Primary Examiner* — Christopher Stanford

(57) ABSTRACT

Various technologies described herein pertain to a lidar sensor system that includes a laser source and a polygon scanning mirror. The laser source can be configured to emit an outgoing optical signal. Moreover, the polygon scanning mirror can be configured to scan the outgoing optical signal from the laser source over a field of view in an environment of the lidar sensor system as the polygon scanning mirror rotates about an axis of rotation. The polygon scanning mirror includes planar optical reflective surfaces around a circumference of the polygon scanning mirror. Moreover, the planar optical reflective surfaces are oriented at angles offset relative to the axis of rotation.

19 Claims, 14 Drawing Sheets

(56) References Cited

U.S. PATENT DOCUMENTS

| | | | | |
|---|---|---|---|---|
| 10,162,171 | B2 * | 12/2018 | Ishikawa | G02B 26/129 |
| 10,545,223 | B2 * | 1/2020 | Hayakawa | G01S 7/4817 |
| 10,649,071 | B2 * | 5/2020 | Ishikawa | G01S 7/4817 |
| 10,754,012 | B2 * | 8/2020 | Galloway | G02B 26/124 |
| 10,775,508 | B1 * | 9/2020 | Rezk | G01S 17/08 |
| 10,838,045 | B2 * | 11/2020 | Crouch | G01S 7/4816 |
| 11,391,822 | B2 * | 7/2022 | Gomez | G02B 26/125 |
| 2020/0049819 | A1 * | 2/2020 | Cho | G01S 7/4815 |
| 2020/0150247 | A1 * | 5/2020 | Ledbetter | G01S 7/4815 |
| 2020/0225328 | A1 * | 7/2020 | Mohr | G02B 26/125 |

FOREIGN PATENT DOCUMENTS

| | | | | |
|---|---|---|---|---|
| CN | 100412608 C | * | 8/2008 | |
| CN | 103728725 A | * | 4/2014 | |
| EP | 2293013 A2 | * | 3/2011 | G01C 15/002 |
| KR | 20200143049 A | * | 12/2020 | |
| KR | 20210128179 A | * | 10/2021 | |
| WO | WO-2006119689 A1 | * | 11/2006 | H04N 5/74 |

* cited by examiner

POLYGON SCANNING MIRROR FOR LIDAR BEAM SCANNING

BACKGROUND

Autonomous vehicles are currently in development, where an autonomous vehicle includes various sensor systems that output sensor signals as well as a computing system that controls operation of the autonomous vehicle based upon the sensor signals outputted by the sensor systems. The sensor systems of the autonomous vehicle may include a lidar sensor system configured to generate a three-dimensional point cloud of surroundings of the autonomous vehicle. Points in the point cloud represent distances between the lidar sensor system and objects in a field of view of the lidar sensor system. A conventional lidar sensor system typically includes a laser source that emits an optical signal that is transmitted into an environment nearby the lidar sensor system and a photodetector that detects a returned optical signal, where the returned optical signal is based upon the optical signal reflecting from an object in the environment nearby the lidar sensor system. Based upon a parameter of the returned optical signal, a distance between the lidar sensor system and the object can be computed. The computing system of the autonomous vehicle can control operation of the autonomous vehicle based upon the computed distance. Additionally, a velocity of the object can be computed based upon a parameter of the returned optical signal; the velocity can likewise be used by the computing system to control operation of the autonomous vehicle.

Various conventional lidar sensor systems utilize Micro-Electro-Mechanical System (MEMS) based mirrors to scan an optical signal over a field of view in an environment nearby the lidar sensor system. The MEMS mirror can be a miniaturized electro-mechanical device fabricated using a microfabrication process. MEMS mirrors in conventional lidar sensor systems, however, are often unreliable and have limited lifetimes. Accordingly, MEMS mirrors incorporated as part of lidar sensor systems in autonomous vehicles may break over time (e.g., due to environmental conditions to which the MEMS mirrors are exposed, due to the amount of time the MEMS mirrors are to be operated as part of autonomous vehicles each driving many thousands of miles). For instance, since an autonomous vehicle may drive over potholes, speedbumps, or the like, a MEMS mirror may be subjected to vibrations that can cause failure of such device.

Moreover, conventional MEMS mirrors may be relatively small (e.g., diameter on the order of 5 mm). Diameters of MEMS mirrors can be limited because weight becomes an issue as diameter of a MEMS mirror is increased. For instance, scanning properties of MEMS mirrors can be detrimentally impacted as diameters (and weights) of the MEMS mirrors are increased. According to an example, a larger MEMS mirror may be unable to move as fast as a smaller MEMS mirror. Thus, the larger MEMS mirror may be unable to scan an optical signal over a field of view in an environment as fast as a smaller MEMS mirror (e.g., impacting a frame rate of a conventional lidar sensor system that includes the larger MEMS mirror). Moreover, the larger MEMS mirror may be unable to scan across as wide of a field of view as a smaller MEMS mirror. Further, an amount of signal that can be collected by a MEMS mirror is based on the diameter of the MEMS mirror (e.g., a MEMS mirror with a larger diameter can collect more photons as compared to a MEMS mirror with a smaller diameter); thus, a smaller MEMS mirror may be unable to detect objects at longer ranges (which may be detectable using larger MEMS mirrors, which can impact a speed at which an autonomous vehicle including the smaller MEMS mirror may be able to travel). Thus, a tradeoff between an amount of signal that can be collected (e.g., range), scan speed, and scan field of view can exist with conventional lidar sensor systems that include MEMS mirrors (e.g., larger MEMS mirrors can provide greater amounts of signal whereas smaller MEMS mirrors can provide faster and wider scans).

SUMMARY

The following is a brief summary of subject matter that is described in greater detail herein. This summary is not intended to be limiting as to the scope of the claims.

Described herein are various technologies that pertain to a lidar sensor system that includes a laser source and a polygon scanning mirror. The laser source can be configured to emit an outgoing optical signal. Moreover, the polygon scanning mirror can be configured to scan the outgoing optical signal from the laser source over a field of view in an environment of the lidar sensor system as the polygon scanning mirror rotates about an axis of rotation. The polygon scanning mirror includes planar optical reflective surfaces around a circumference of the polygon scanning mirror. Moreover, the planar optical reflective surfaces are oriented at angles offset relative to the axis of rotation. The polygon scanning mirror scans the outgoing optical signal into the environment as the polygon scanning mirror rotates about the axis of rotation according to a scan pattern provided by the polygon scanning mirror. The scan pattern can be based on a number of the planar optical reflective surfaces of the polygon scanning mirror, respective orientations of the planar optical reflective surfaces, respective sizes of the planar optical reflective surfaces, and so forth. According to various embodiments, the lidar sensor system that includes the polygon scanning mirror can be included in an autonomous vehicle.

In accordance with various embodiments, two or more of the planar optical reflective surfaces of the polygon scanning mirror can be oriented at differing angles relative to the axis of rotation. Additionally or alternatively, two or more of the planar optical reflective surfaces of the polygon scanning mirror can be oriented at a common angle relative to the axis of rotation.

According to various embodiments, the lidar sensor system can include a plurality of polygon scanning mirrors. The differing polygon scanning mirrors can provide differing scan patterns. The plurality of polygon scanning mirrors can be aligned along an axis of rotation; the polygon scanning mirrors can be linearly moved along the axis of rotation to change from an outgoing optical signal from the laser source being scanning into the environment using one of the polygon scanning mirrors to the outgoing optical signal being scanned into the environment using a different one of the polygon scanning mirrors (e.g., to change between scan patterns).

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 2:
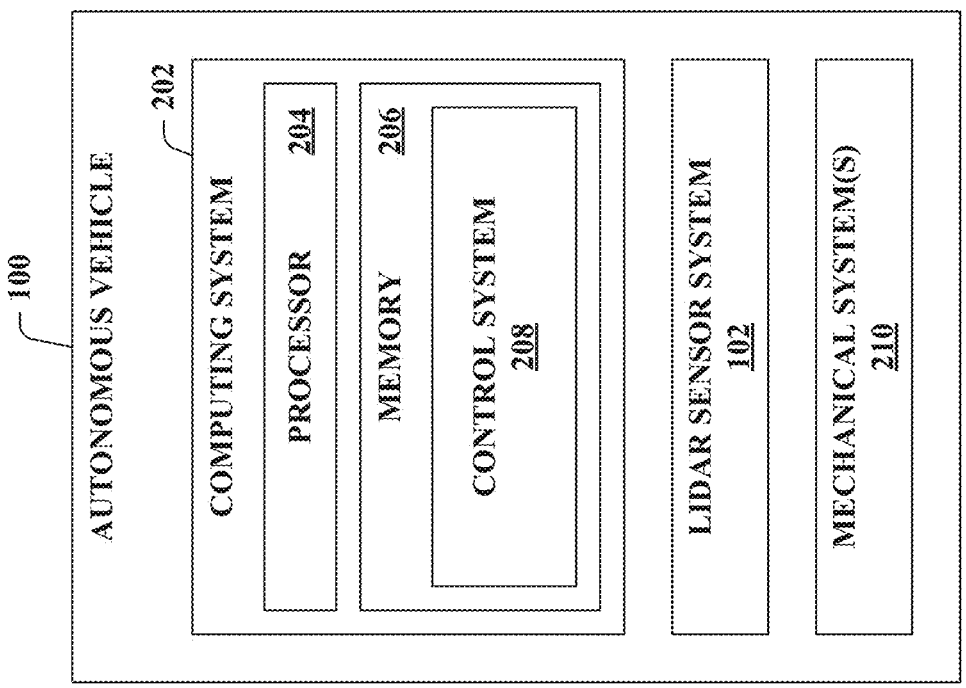
FIG. 2 illustrates a block diagram of an exemplary autonomous vehicle.

Various technologies pertaining to a polygon scanning mirror for lidar beam scanning are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

As used herein, the term "exemplary" is intended to mean "serving as an illustration or example of something."

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

As used herein, and unless the context dictates otherwise, the term "coupled to" is intended to include both direct coupling (in which two elements that are coupled to each other contact each other) and indirect coupling (in which at least one additional element is located between the two elements).

Figure 1:
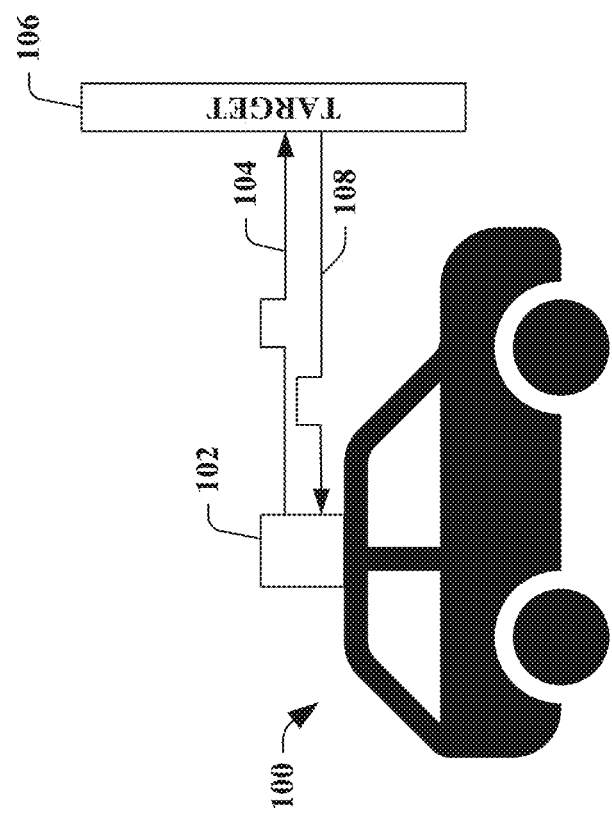
FIG. 1 illustrates an exemplary autonomous vehicle in an environment.

Referring now to the drawings, FIG. 1 illustrates an exemplary autonomous vehicle 100 in an environment. The autonomous vehicle 100 includes a lidar sensor system 102. The lidar sensor system 102 can be a scanning lidar sensor system. The lidar sensor system 102 emits an outgoing optical signal 104 into the environment nearby the autonomous vehicle 100. As shown in the example of FIG. 1, the outgoing optical signal 104 impacts a target 106, which may be stationary or moving relative to the autonomous vehicle 100, resulting in a returned optical signal 108 being returned to the lidar sensor system 102.

Based on the returned optical signal 108, the lidar sensor system 102 can compute a distance to the target 106 relative to the lidar sensor system 102. The lidar sensor system 102 can also compute a velocity of the target 106 relative to the lidar system 102. The lidar sensor system 102 can repeat this process for several outgoing optical signals directed to different spatial regions around the autonomous vehicle 100, such that the lidar sensor system 102 can generate a three-dimensional point cloud, wherein a point in the point cloud represents a distance between the lidar sensor system 102 and a target (e.g., the target 106). The outgoing optical signals can be scanned over a field of view using a polygon scanning mirror as set forth in greater detail herein. Moreover, as described in greater detail below, the autonomous vehicle 100 can include a computing system that can receive point clouds outputted by the lidar sensor system 102, as well as outputs of other sensor systems, wherein the computing system can control operation of the autonomous vehicle 100 based on the point clouds outputted by the lidar sensor system 102. For example, the computing system can control a propulsion system, a braking system, and/or a steering system of the autonomous vehicle 100 based upon the point clouds outputted by the lidar sensor system 102.

Now turning to FIG. 2, illustrated is a block diagram of the autonomous vehicle 100 according to various aspects. The autonomous vehicle 100 includes the lidar sensor system 102 and a computing system 202. The computing system 202 includes a processor 204 and memory 206, where the memory 206 has a control system 208 loaded therein. The control system 208 can be configured to control operation of the autonomous vehicle 100. For instance, the autonomous vehicle 100 can include various mechanical systems 210 that are used to effectuate appropriate motion of the autonomous vehicle 100. The mechanical systems 210 can include, for example, a propulsion system, a braking system, and a steering system.

The computing system 202 can receive a point cloud outputted by the lidar sensor system 102. Moreover, the control system 208 can control operation of the autonomous vehicle 100 based upon such point cloud (e.g., the control system 208 can control the mechanical systems 210 of the autonomous vehicle 100). For example, the control system 208 can cause the autonomous vehicle 100 to accelerate or decelerate based upon the point cloud outputted by the lidar sensor system 102, can cause the autonomous vehicle 100 to change direction based upon the point cloud outputted by the lidar sensor system 102, can cause the autonomous vehicle 100 to remain stationary based upon the point cloud outputted by the lidar sensor system 102, etc.

While not shown, it is contemplated that the autonomous vehicle 100 can include various types of sensor systems in addition to the lidar sensor system 102 (e.g., radar sensor system, camera sensor system, sonar sensor system, infrared sensor system). Accordingly, the control system 208 can further control operation of the autonomous vehicle 100 based upon outputs from the other types of sensor systems.

Figure 3:
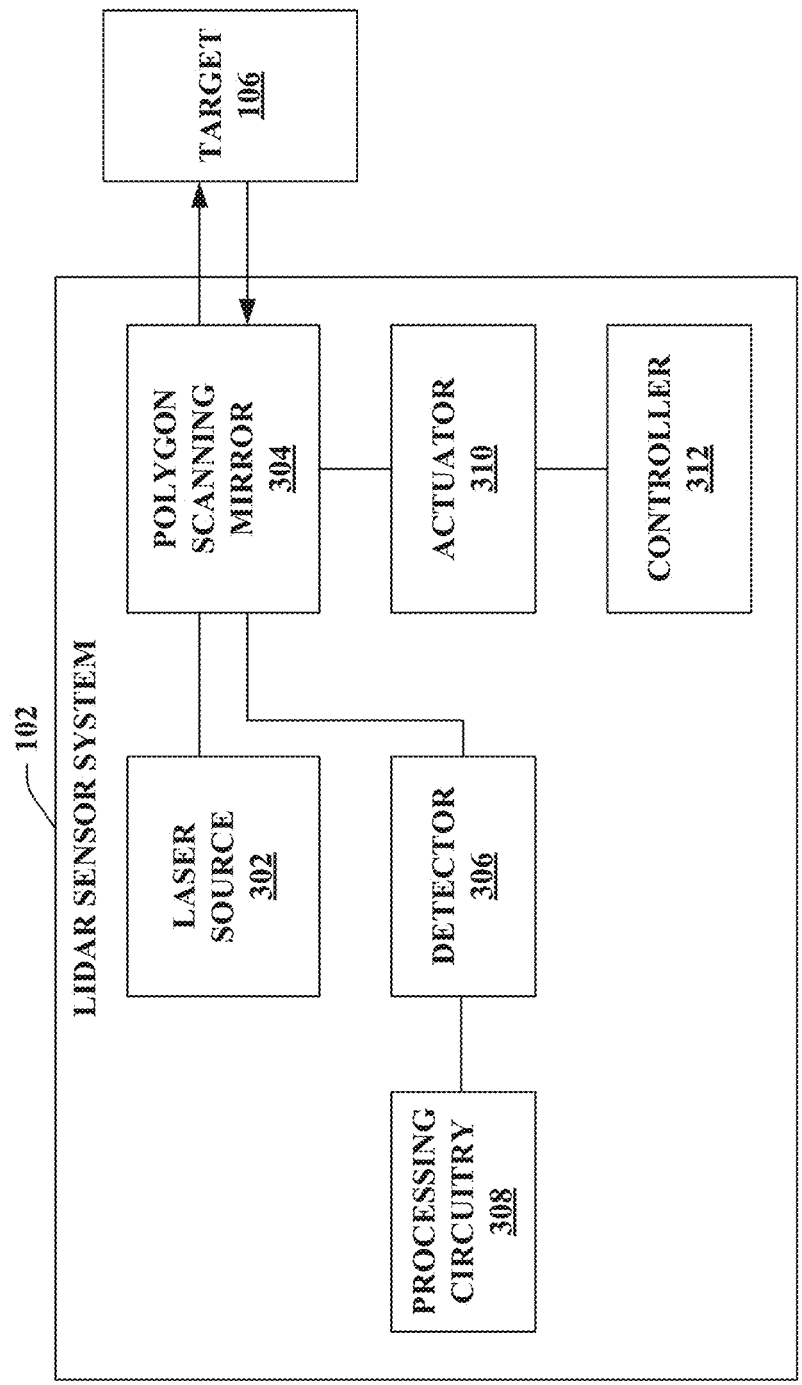
FIG. 3 illustrates a block diagram of an exemplary lidar sensor system.

Now turning to FIG. 3, illustrated is a block diagram of an exemplary embodiment of the lidar sensor system 102. As described herein, the lidar sensor system 102 can transmit an outgoing optical signal that can impact the target 106, causing the returned optical signal 108 to be returned to the lidar sensor system 102. A distance to the target 106 from the lidar sensor system 102 and/or a velocity of the target 106 can be determined based on the returned optical signal 108.

The lidar sensor system 102 includes a laser source 302 configured to emit an outgoing optical signal. According to various examples, the laser source 302 can be a distributed feedback (DFB) laser, a distributed Bragg reflector (DBR) laser, a Fabry Perot laser, or the like; however, substantially any type of laser source is intended to fall within the scope of the hereto appended claims.

Moreover, the lidar sensor system 102 includes a polygon scanning mirror 304. The polygon scanning mirror 304 can scan the outgoing optical signal (e.g., an outgoing optical beam) from the laser source 302 over a field of view in an environment of the lidar sensor system 102 (e.g., an environment of the autonomous vehicle 100 where the autonomous vehicle 100 includes the lidar sensor system 102). Accordingly, the polygon scanning mirror 304 can be used as part of the lidar sensor system 102 to determine range, velocity, and/or angular field location of the target 106 (e.g., an object of interest to the autonomous vehicle 100). The polygon scanning mirror 304 can similarly be used to determine range, velocity, and/or angular field location of other target(s) in proximity of the lidar sensor system 102.

The polygon scanning mirror 304 can include a polygon segment that can rotate about a fixed (stationary axis) at a constant or variable angular velocity (e.g., the polygon scanning mirror 304 can be rotated on the order of 10,000 rotations per minute). Outer surfaces of the polygon scanning mirror 304 include planar optical reflective surfaces. The planar optical reflective surfaces can be optically coated for high reflectivity at an appropriate laser wavelength(s). Accordingly, the outgoing optical signal from the laser source 302 can be incident on one of the planar optical reflective surfaces at a given time; the planar optical reflective surface can reflect and thereby direct the outgoing optical signal incident thereupon in a direction that falls within a field of view of the lidar sensor system 102. Moreover, if the polygon scanning mirror 304 is in a stationary (non-rotating) state, the outgoing optical signal is reflected in a fixed direction.

When the polygon scanning mirror 304 is in a rotational state, a point of intersection of the outgoing optical signal from the laser source 302 and a surface of the polygon scanning mirror 304 moves across the planar optical reflective surfaces of the polygon scanning mirror 304. Thus, as the polygon scanning mirror 304 is rotated, the outgoing optical signal (e.g., the outgoing beam) is continuously scanned in three-dimensional space along a trajectory that is approximately perpendicular to the axis of rotation of the polygon scanning mirror 304. In general, the trajectory of the outgoing optical signal reflected from the polygon scanning mirror 304 across the field of view can be curved. Moreover, in the case where a planar optical reflective surface of the polygon scanning mirror 304 is oriented in a plane that is parallel to the axis of rotation, the outgoing optical signal can follow a planar trajectory.

As the polygon scanning mirror 304 is rotated, the outgoing optical signal from the laser source 302 incident thereupon moves across a particular planar optical reflective surface of the polygon scanning mirror 304 until it reaches a surface edge, where the outgoing optical signal transitions to an adjacent planar optical reflective surface of the polygon scanning mirror 304. At the edge transition between the planar optical reflective surfaces, an angle of reflection undergoes a discontinuous change.

According to various examples, two or more of the planar optical reflective surfaces of the polygon scanning mirror 304 can reflect the outgoing optical signal from the laser source 302 incident upon such planar optical reflective surfaces along different curved trajectories. Additionally or alternatively, two or more of the planar optical reflective surfaces of the polygon scanning mirror 304 can reflect the outgoing optical signal from the laser source 302 incident upon such planar optical reflective surfaces along a common curved trajectory. The trajectories can be based on orientations of the planar optical reflective surfaces of the polygon scanning mirror 304 relative to the axis of rotation of the polygon scanning mirror 304.

Over the course of a full rotation of the polygon scanning mirror 304, the outgoing optical signal can be scanned through a family of curved trajectories. The relative orientations of the planar optical reflective surfaces of the polygon scanning mirror 304 can be designed such that for a given incident angle from the laser source 302, the outgoing optical signal reflected by the planar optical reflective surfaces of the polygon scanning mirror 304 can trace out a family of two dimensional curves that cover a desired field of view of the lidar sensor system 102. Thus, after a complete 360 degree revolution of the polygon scanning mirror 304, the outgoing optical signal from the laser source 302 reflected by the planar optical reflective surfaces of the polygon scanning mirror 304 can repeat a scan pattern, which can correspond to a single sensor frame.

Although not shown, it is contemplated that the lidar sensor system 102 can include various elements in addition to the laser source 302 that can enable generating the outgoing optical signal. For instance, the additional elements can generate pulses or chirps included as part of the outgoing optical signal, amplify an optical signal, or the like; yet, the claimed subject matter is not so limited.

The polygon scanning mirror 304 can receive the returned optical signal 108 responsive to the outgoing optical signal being transmitted from the lidar sensor system 102. The returned optical signal 108 can correspond to at least a part of the outgoing optical signal transmitted into the environment that reflected off the target 106 (or other target(s)) in the environment. The lidar sensor system 102 can further include a detector 306 and processing circuitry 308. The detector 306 (e.g., photodetector(s)) can output a signal based on the returned optical signal 108. Moreover, the processing circuitry 308 can determine a distance to the target 106, velocity of the target 106 relative to the lidar system 102, and/or angular field location of the target 106 relative to the lidar system 102 based on the signal outputted by the detector 306.

Although not shown, the lidar sensor system 102 can include other front end optics in addition to the polygon scanning mirror 304. The other front end optics can include optical elements such as, for example, one or more lenses, an optical isolator, one or more waveguides, an optical amplifier, and so forth. Such optical elements can enable generating the outgoing optical signal with desired properties such as collimation, divergence angle, linewidth, power, and the like. Such optical elements may be assembled discretely, integrated on a chip, or a combination of both.

The lidar sensor system 102 further includes an actuator 310 and a controller 312. The actuator 310 can cause movement of the polygon scanning mirror 304. For example, the actuator 310 can cause the polygon scanning mirror to rotate about an axis of rotation. Moreover, the controller 312 can control the actuator 310. For example, the controller 312 can start or stop the actuator 310. According to another example, the controller 312 can control an angular velocity of the polygon scanning mirror 304 caused by the actuator 310 (e.g., the angular velocity can be variable, the angular velocity can be fixed). The angular velocity of the polygon scanning mirror 304 can be determined based on a desired frame rate of the lidar sensor system 102. Pursuant to another example, the controller 312 can control a direction of rotation of the polygon scanning mirror 304 caused by the actuator 310 (e.g., clockwise versus counterclockwise rotation from a perspective above the polygon scanning mirror 304).

Pursuant to various embodiments, it is contemplated that the lidar sensor system 102 can include a plurality of polygon scanning mirrors (e.g., including the polygon scanning mirror 304). The different polygon scanning mirrors can provide differing scan patterns. For example, the plurality of polygon scanning mirrors can be aligned along an axis of rotation. Following this example, the actuator 310 (as controlled by the controller 312) can linearly move the polygon scanning mirrors along the axis of rotation to change from the outgoing optical signal being scanned into the environment using one of the polygon scanning mirrors to the outgoing optical signal being scanned into the environment using a different one of the polygon scanning mirrors.

According to an illustration, a first polygon scanning mirror can provide a first scan pattern and a second polygon scanning mirror can provide a second scan pattern. The first scan pattern can be a sparse pattern over a wide field of view, while the second scan pattern can be a dense pattern over a narrow field of view. Thus, the actuator 310 can linearly move the polygon scanning mirrors along the axis of rotation to change between the first and second scan patterns.

As compared to conventional lidar sensor systems that include MEMS mirrors, the lidar sensor system 102 that includes the polygon scanning mirror 304 can have enhanced reliability (lower failure rate) and an increased lifetime. Moreover, control of the polygon scanning mirror 304 in the lidar sensor system 102 can be simpler than control of a MEMS mirror in a conventional lidar sensor system. Further, widths (and heights) of the planar optical reflective surfaces of the polygon scanning mirror 304 can be larger than diameters of conventional MEMS mirrors used in traditional lidar sensor systems; accordingly, the planar optical reflective surfaces of the polygon scanning mirror 304 can enable more photons reflected from a target (e.g., the target 106) in an environment to be collected, which can allow for detecting objects at longer ranges from the lidar sensor system 102.

Figure 4:
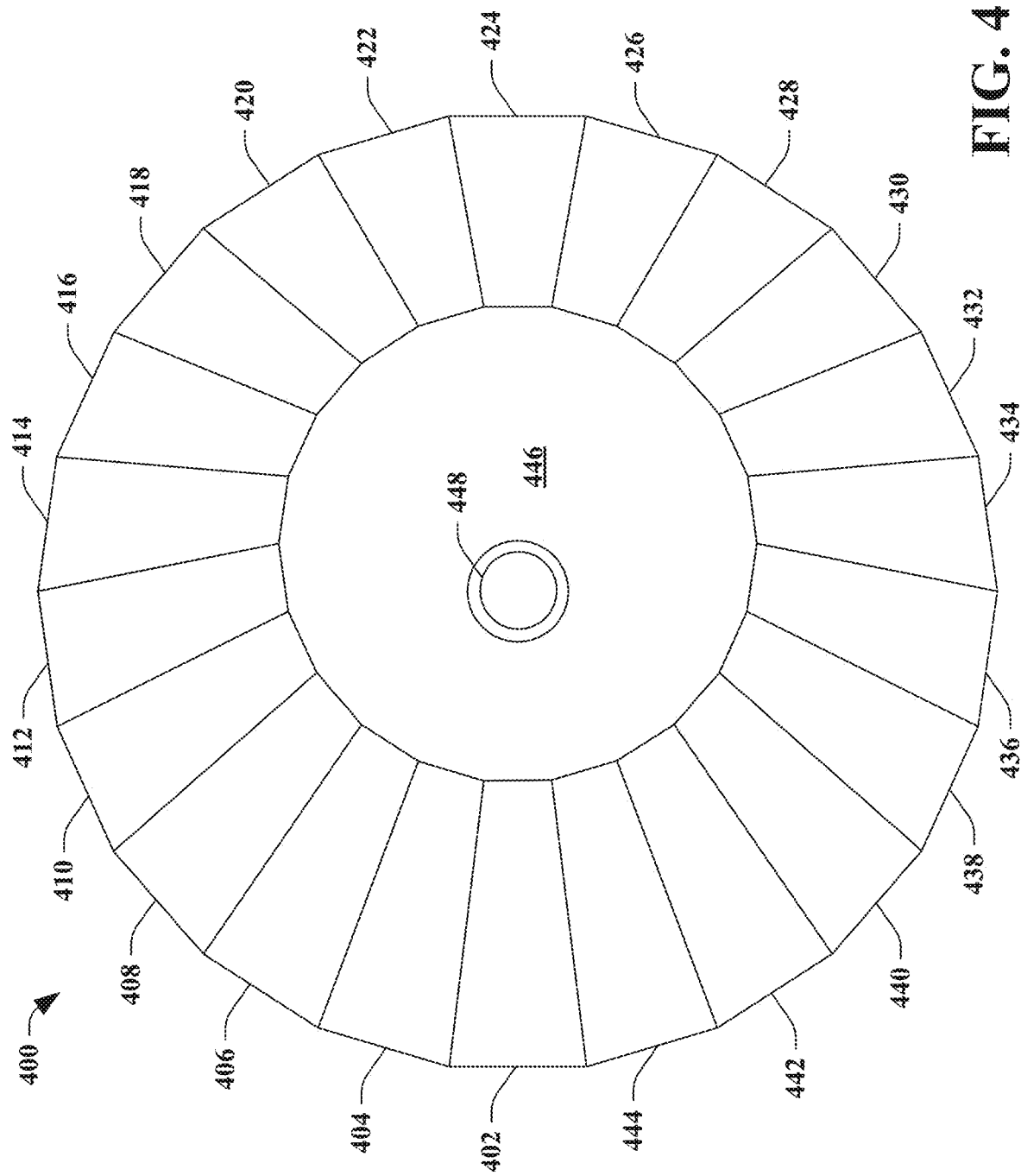
FIGS. 4-8 illustrate various views of an exemplary polygon scanning mirror of a lidar sensor system.

Turning to FIG. 4, illustrated is a top view of an exemplary polygon scanning mirror 400 (e.g., the polygon scanning mirror 304). The polygon scanning mirror 400 includes 22 planar optical reflective surfaces 402-444. Moreover, the polygon scanning mirror 400 includes a top surface 446. An aperture 448 is formed through the top surface 446 and passes through the polygon scanning mirror 400 along an axis of rotation. Accordingly, a shaft can be positioned through the aperture 448 to enable the polygon scanning mirror 400 to rotate about the axis of rotation.

Figure 5:
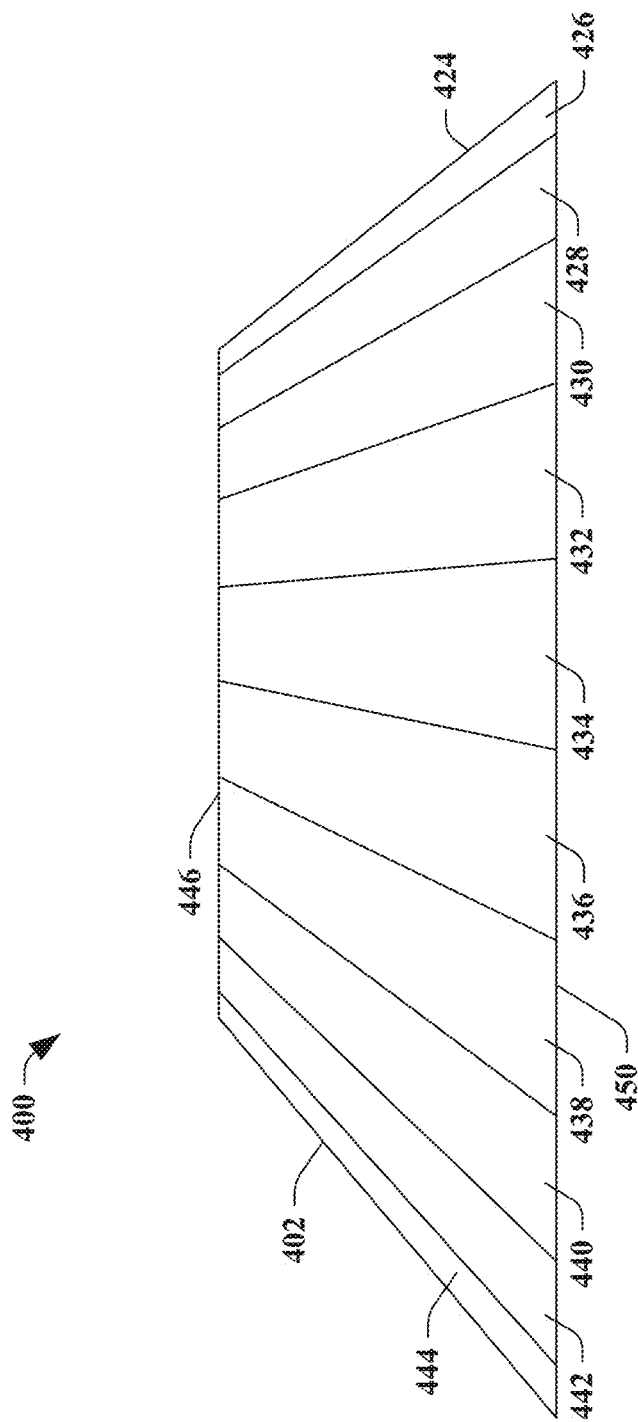

It is noted that a geometric center of the top surface 446 is offset from a geometric center of a bottom surface 450 (shown in FIG. 5). Moreover, the bottom surface 450 is larger than the top surface 446. The axis of rotation of the polygon scanning mirror 400 can be centered at a centroid of the bottom surface 450 to provide eccentricity-free rotary motion (since eccentric motion can detrimentally impact scan integrity).

The planar optical reflective surfaces 402-444 can be offset in a sinusoidally varying manner around a circumference of the polygon scanning mirror 400. According to an example, the planar optical reflective surface 402 can be oriented at an initial angle relative to an axis of rotation of the polygon scanning mirror 400. Each of the other planar optical reflective surfaces 404-444 can be offset relative to the planar optical reflective surface 402. For instance, along the circumference of the polygon scanning mirror 400 from the planar optical reflective surface 402 in a clockwise direction from a perspective shown in the top view, the planar optical reflective surfaces 404-424 can be oriented at incrementally increasing angles. Further, from the planar optical reflective surface 424 back to the planar optical reflective surface 402 along the circumference of the polygon scanning mirror in the clockwise direction, the planar optical reflective surfaces 426-444 can be oriented at incrementally decreasing angles.

Figure 10:
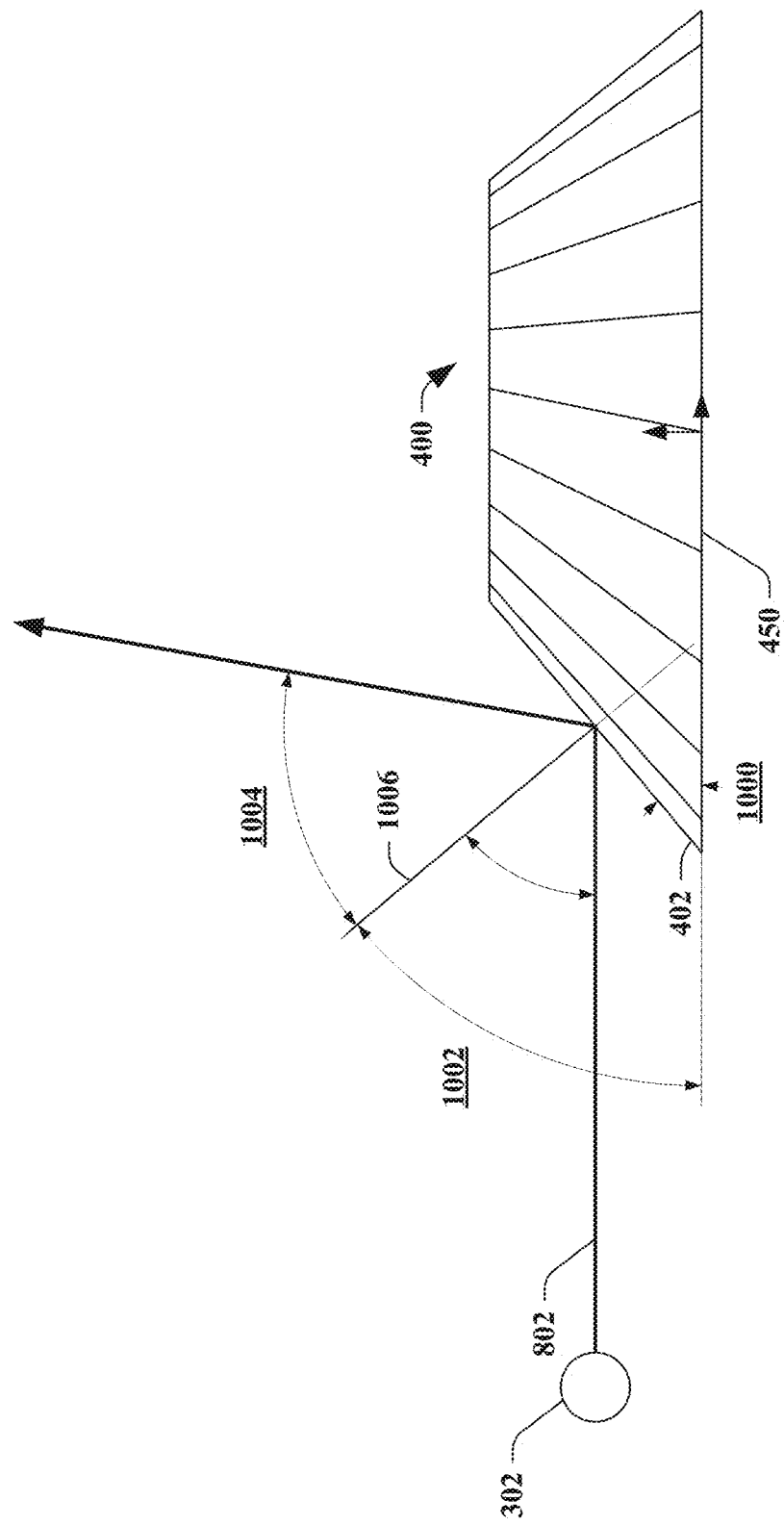
FIG. 10 illustrates an exemplary beam diagram where an outgoing optical signal is provided from a laser source and reflects off of a planar optical reflective surface of the polygon scanning mirror of FIGS. 4-8 at a given point in time.

By way of example, angles of the planar optical reflective surfaces 402-444 relative to the axis of rotation can be as follows (e.g., FIG. 10 depicts an example of such angle). Planar optical reflective surface 402: 39.81 degrees; planar optical reflective surface 404: 40 degrees; planar optical reflective surface 406: 40.56 degrees; planar optical reflective surface 408: 41.48 degrees; planar optical reflective surface 410: 42.72 degrees; planar optical reflective surface 412: 44.20 degrees; planar optical reflective surface 414: 45.83 degrees; planar optical reflective surface 416: 47.48 degrees; planar optical reflective surface 418: 49.01 degrees; planar optical reflective surface 420: 50.25 degrees; planar optical reflective surface 422: 51.06 degrees; planar optical reflective surface 424: 51.34 degrees; planar optical reflective surface 426: 51.06 degrees; planar optical reflective surface 428: 50.25 degrees; planar optical reflective surface 430: 49.01 degrees; planar optical reflective surface 432: 47.48 degrees; planar optical reflective surface 434: 45.83 degrees; planar optical reflective surface 436: 44.20 degrees; planar optical reflective surface 438: 42.72 degrees; planar optical reflective surface 440: 41.48 degrees; planar optical reflective surface 442: 40.56 degrees; and planar optical reflective surface 444: 40 degrees. It is to be appreciated, however, that the claimed subject matter is not limited to the foregoing example, and other angles are intended to fall within the scope of the hereto appended claims.

Now turning to FIG. 5, illustrated is a side view of the polygon scanning mirror 400 of FIG. 4. The planar optical reflective surface 402 as well as the planar optical reflective surfaces 424-444 are shown in FIG. 5. Moreover, the top surface 446 and a bottom surface 450 of the polygon scanning mirror 400 are depicted in FIG. 5. As depicted in FIG. 5, the geometric center of the top surface 446 is offset from the geometric center of the bottom surface 450.

Figure 6:
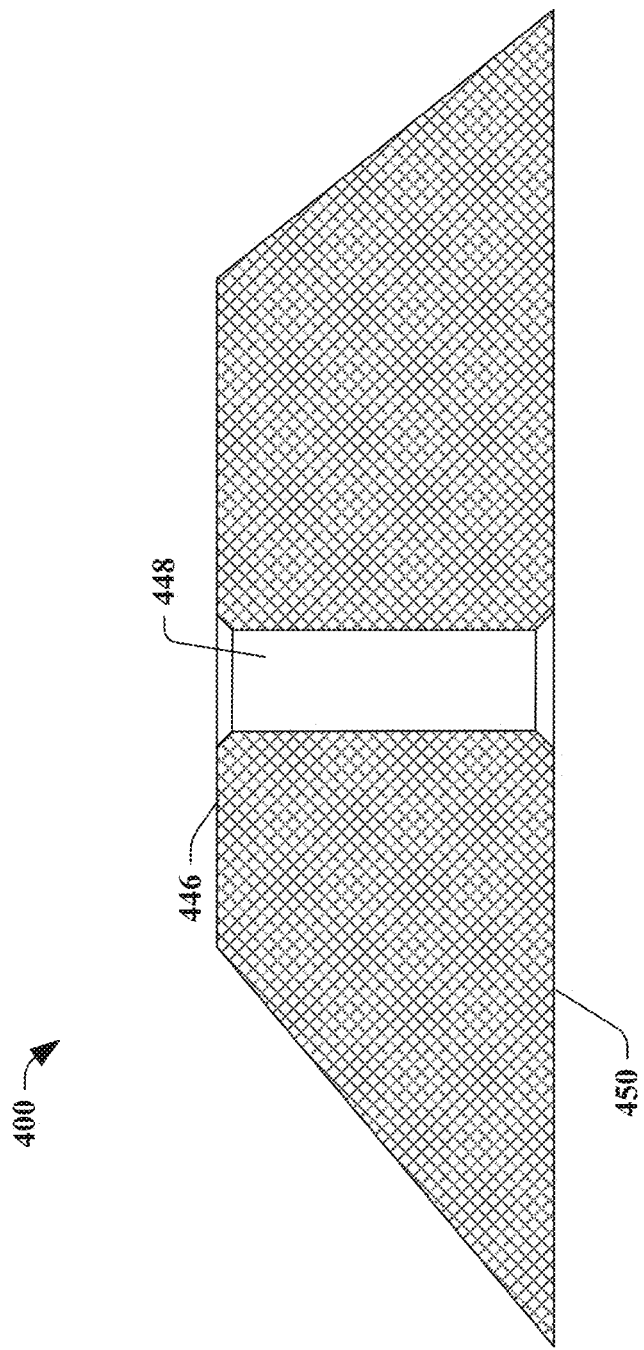
Figure 7:
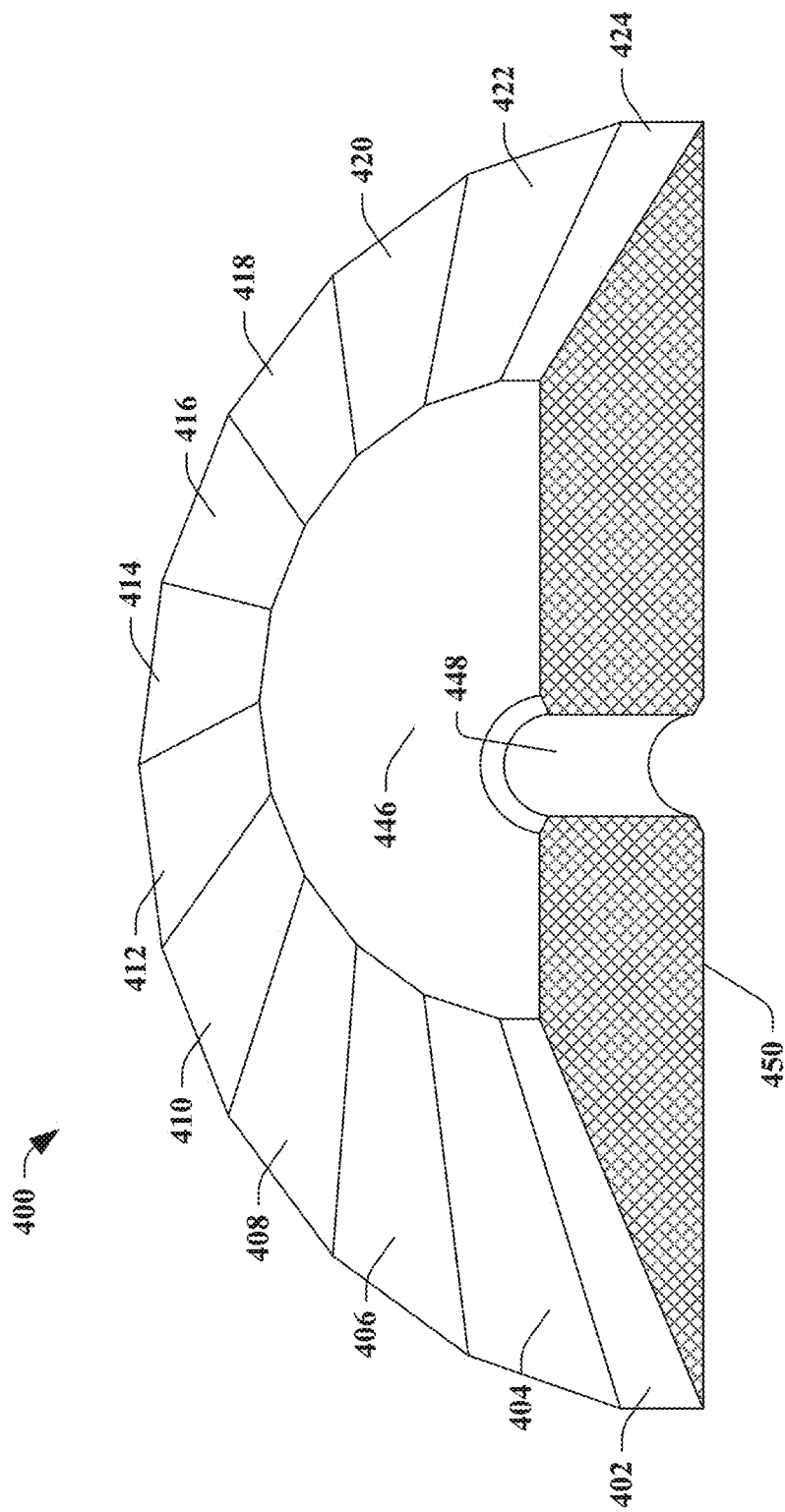

With reference to FIG. 6, illustrated is a cross-sectional view of the polygon scanning mirror 400 of FIG. 4. The polygon scanning mirror 400 is cut along a center of the bottom surface 450. As depicted, the aperture 448 is defined through the polygon scanning mirror 400 along an axis of rotation. For instance, a shaft can be positioned through the aperture 448. Further, FIG. 7 illustrates a 45-degree inclined view of the cross-sectional cut of the polygon scanning mirror 400 depicted in FIG. 6.

Figure 8:
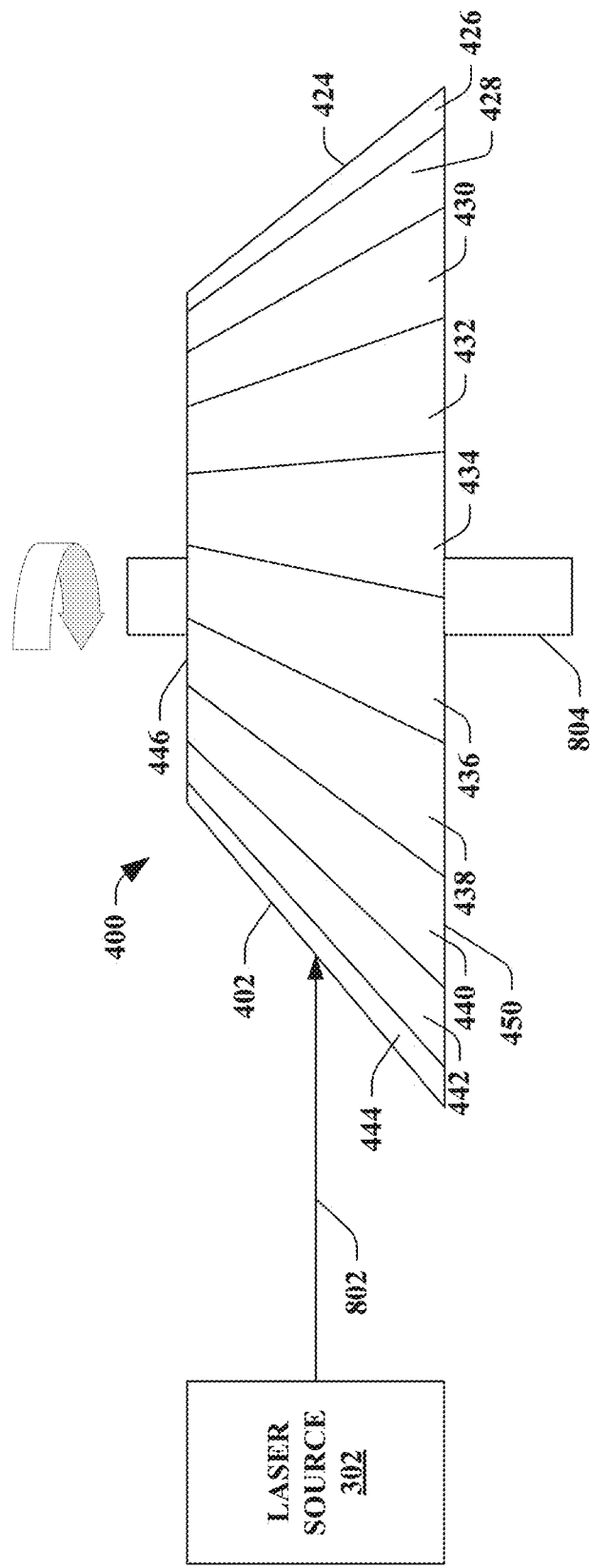

FIG. 8 depicts an exemplary orientation of the laser source 302 relative to the polygon scanning mirror 400. An outgoing optical signal 802 is provided from the laser source 302 and is incident upon the planar optical reflective surfaces 402-444 as the polygon scanning mirror 400 rotates about a shaft 804 positioned along the axis of rotation. The laser source 302 may direct the outgoing optical signal 802 towards an axis of rotation of the polygon scanning mirror 400; however, it is contemplated that the laser source 302 need not be aligned in such a manner (e.g., the outgoing optical signal 802 can be directed elsewhere other than towards the axis of rotation while still reflecting off of the polygon scanning mirror 400). Moreover, while the outgoing optical signal 802 is illustrated as being incident on the polygon scanning mirror 400 in a direction parallel to the top surface 446 (and in a direction parallel to the bottom surface 450), it is to be appreciated that the outgoing optical signal 802 can be directed at other angles of incidence.

It is to be appreciated that the polygon scanning mirror 400 can rotate clockwise or counterclockwise about the axis of rotation (from a top view as shown in FIG. 4). As the polygon scanning mirror 400 rotates about the axis, the outgoing optical signal is reflected by the planar optical reflective surfaces 402-444 at different times during a complete revolution of the polygon scanning mirror 400. As illustrated in FIG. 8, the outgoing optical signal is incident upon and reflected by the planar optical reflective surface 402 at the depicted time.

Figure 9:
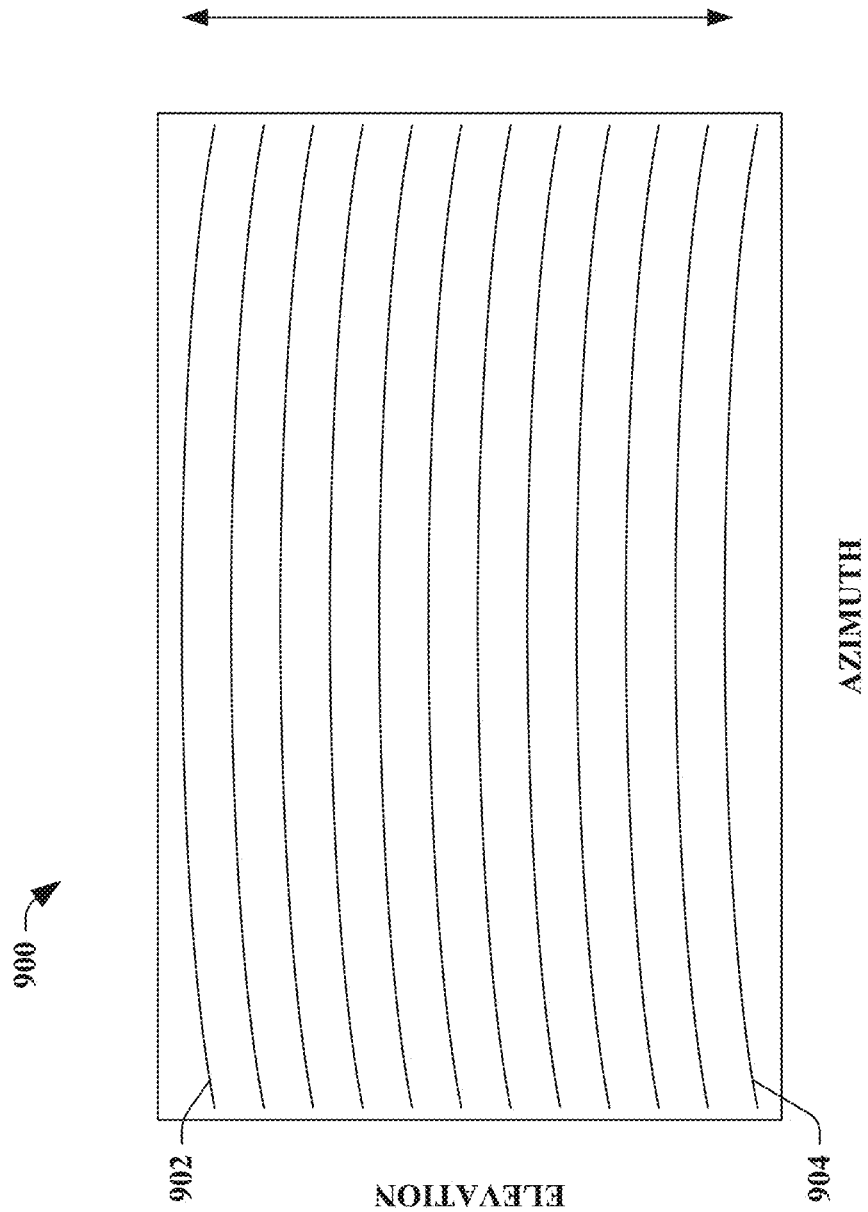
FIG. 9 illustrates an exemplary scan pattern over a field of view provided by the polygon scanning mirror of FIGS. 4-8.

FIG. 9 shows a scan pattern 900 over a field of view provided by the polygon scanning mirror 400. Scan lines (such as a scan line 902 and a scan line 904) in the scan pattern 900 correspond to the planar optical reflective surfaces 402-444 of the polygon scanning mirror 400 as the polygon scanning mirror 400 rotates. It is to be appreciated that the scan pattern 900 is illustrative, and the number, width, density, etc. of the scan lines depend on the design of the polygon scanning mirror 400. The scan pattern 900 is generated over a 360 degree rotation of the polygon scanning mirror 400. Moreover, planar optical reflective surfaces oriented at substantially similar angles relative to the axis of rotation can provide substantially similar scan lines in the scan pattern 900. Accordingly, the scan pattern 900 can include 12 scan lines (e.g., due to the polygon scanning mirror 400 including planar optical reflective surfaces 402-444 oriented at 12 different angles relative to the axis of rotation).

Pursuant to an example, as the polygon scanning mirror 400 rotates, the outgoing optical signal can be directed across a scan line in the scan pattern 900 (corresponding to a particular one of the planar optical reflective surfaces 402-444). When an adjacent one of the planar optical reflective surfaces 402-444 begins to reflect the outgoing optical signal into the environment as the polygon scanning mirror 400 rotates, the outgoing optical signal can be directed across an adjacent scan line in the scan pattern 900. The foregoing can continue as the polygon scanning mirror 400 rotates. A single frame corresponding to a 360 degree rotation of the polygon scanning mirror 400 can include directing the outgoing optical signal across each of the scan lines in the scan pattern 900 sequentially up and down in the elevation direction (or down and up in the elevation direction) (e.g., the scan lines other than the scan line 902 and the scan line 904 can be repeated in the single frame).

FIG. 10 illustrates a beam diagram where the outgoing optical signal 802 is provided from the laser source 302 and reflects off of the planar optical reflective surface 402 of the polygon scanning mirror 400 at a given point in time. As noted in the example above, the planar optical reflective surface 402 can be oriented at an angle of 39.81 degrees relative to the axis of rotation. Such angle is depicted in FIG. 10 at 1000 (e.g., the angle formed between the planar optical reflective surface 404 and the bottom surface 450). Further, the optical signal 802 can be incident upon the planar optical reflective surface 402 at an angle 1002 relative to a normal 1006 of the planar optical reflective surface 402 (e.g., 50.19 degrees). Following this example, the outgoing optical signal 802 can be reflected by the planar optical reflective surface 402 at an angle 1004 relative to the normal 1006 (e.g., 50.19 degrees). Again, it is to be appreciated that the angles noted above are for illustration purposes, and the claimed subject matter is not limited to such angles.

Figure 11:
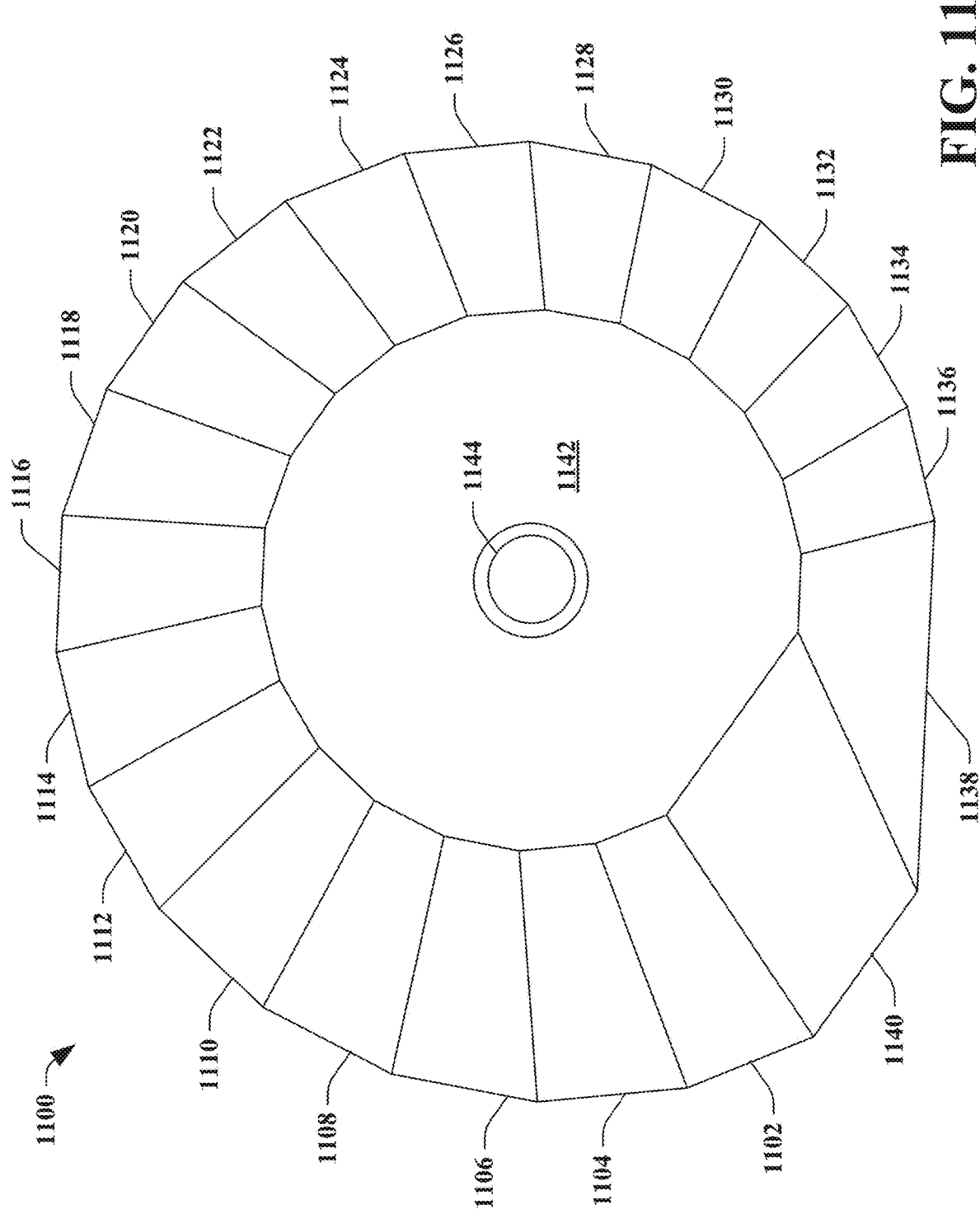
FIG. 11 illustrates a top view of another exemplary polygon scanning mirror of a lidar sensor system.

Turning to FIG. 11, illustrated is a top view of another exemplary polygon scanning mirror 1100 (e.g., the polygon scanning mirror 304). The polygon scanning mirror 1100 includes 20 planar optical reflective surfaces 1102-1140. Moreover, the polygon scanning mirror 1100 includes a top surface 1142, with an aperture 1144 that is formed through the top surface 1144. The aperture 1144 passes through the polygon scanning mirror 1100 along an axis of rotation. Thus, a shaft can be positioned through the aperture 1144 to enable the polygon scanning mirror 1100 to rotate about the axis of rotation.

Similar to the polygon scanning mirror 400, a geometric center of the top surface 1142 is offset from a geometric center of a bottom surface of the polygon scanning mirror 1100. Likewise, the bottom surface of the polygon scanning mirror 1100 is larger than the top surface 1142. The axis of rotation of the polygon scanning mirror 1100 can be centered at a centroid of the bottom surface of the polygon scanning mirror 1100.

The planar optical reflective surfaces 1102-1140 can be offset in an incrementally increasing manner around a circumference of the polygon scanning mirror 1100. For example, the planar optical reflective surface 1102 can be oriented at an initial angle relative to an axis of rotation of the polygon scanning mirror 1100. Each of the other planar optical reflective surfaces 1104-1140 can be offset relative to the planar optical reflective surface 1102. For instance, along the circumference of the polygon scanning mirror 1100 from the planar optical reflective surface 1102 in a clockwise direction from a perspective shown in the top view, the planar optical reflective surfaces 1104-1138 can be oriented at incrementally increasing angles (e.g., one degree increments). Moreover, the planar optical reflective surface 1140 can be oriented at a differing angle.

By way of example, angles of the planar optical reflective surfaces 1102-1140 relative to the axis of rotation can be as follows. Planar optical reflective surface 1102: 46 degrees; planar optical reflective surface 1104: 47 degrees; planar optical reflective surface 1106: 48 degrees; planar optical reflective surface 1108: 49 degrees; planar optical reflective surface 1110: 50 degrees; planar optical reflective surface 1112: 51 degrees; planar optical reflective surface 1114: 52 degrees; planar optical reflective surface 1116: 53 degrees; planar optical reflective surface 1118: 54 degrees; planar optical reflective surface 1120: 55 degrees; planar optical reflective surface 1122: 56 degrees; planar optical reflective surface 1124: 57 degrees; planar optical reflective surface 1126: 58 degrees; planar optical reflective surface 1128: 59 degrees; planar optical reflective surface 1130: 60 degrees; planar optical reflective surface 1132: 61 degrees; planar optical reflective surface 1134: 62 degrees; planar optical reflective surface 1136: 63 degrees; planar optical reflective surface 1138: 64 degrees; and planar optical reflective surface 1140: 47.42 degrees. It is to be appreciated, however, that the claimed subject matter is not limited to the foregoing example, and other angles are intended to fall within the scope of the hereto appended claims.

Figure 12:
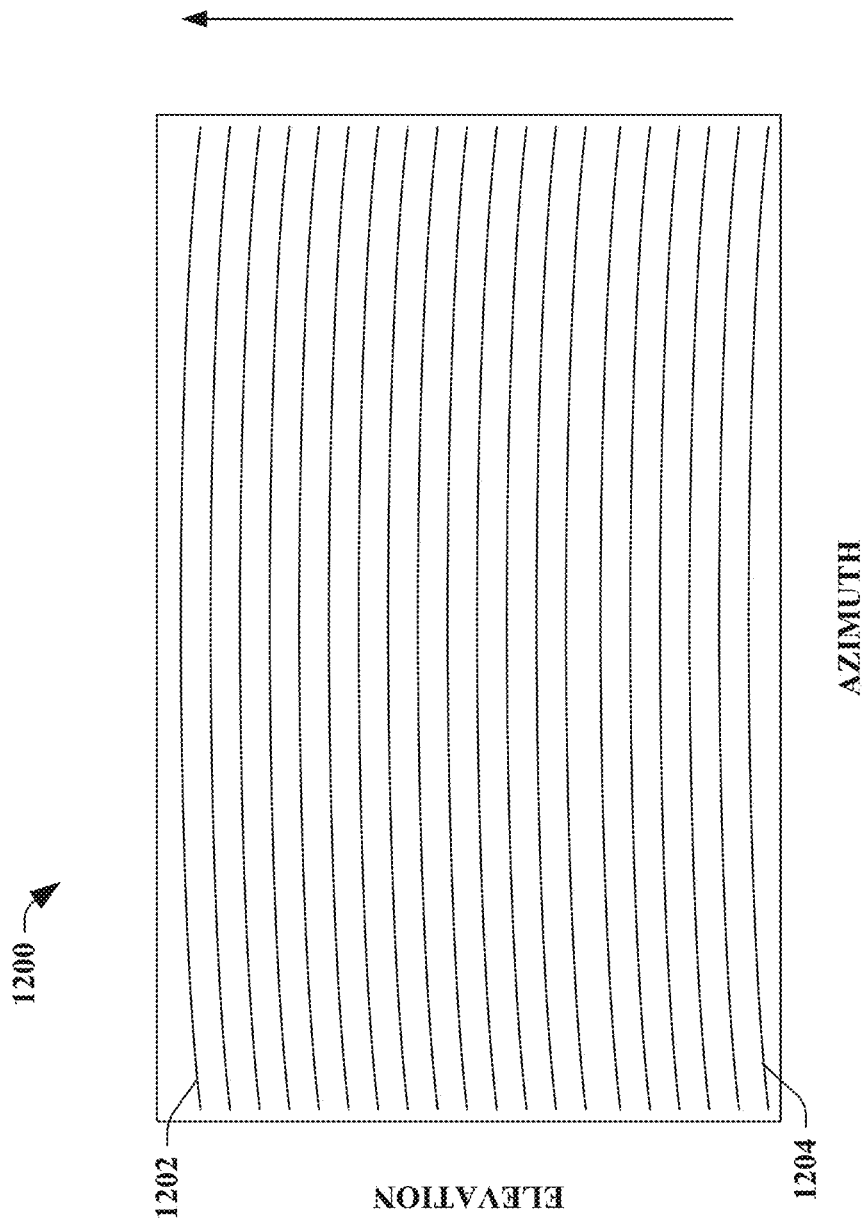
FIG. 12 illustrates an exemplary scan pattern over a field of view provided by the polygon scanning mirror of FIG. 11.

FIG. 12 shows a scan pattern 1200 over a field of view provided by the polygon scanning mirror 1100. Scan lines (such as a scan line 1202 and a scan line 1204) in the scan pattern 1200 correspond to the planar optical reflective surfaces 1102-1140 of the polygon scanning mirror 1100 as the polygon scanning mirror 1100 rotates. Again, it is to be appreciated that the scan pattern 1200 is illustrative, and the number, width, density, etc. of the scan lines depend on the design of the polygon scanning mirror 1100. The scan pattern 1200 is generated over a 360 degree rotation of the polygon scanning mirror 1200. The scan pattern 1200 can include 20 scan lines (e.g., due to the polygon scanning mirror 1100 including planar optical reflective surfaces 1102-1140 oriented at 20 different angles relative to the axis of rotation). A single frame corresponding to a 360 degree rotation of the polygon scanning mirror 1100 can include directing the outgoing optical signal across each of the scan lines in the scan pattern 1200 sequentially up in the elevation direction (or down in the elevation direction) (e.g., sequentially from the scan line 1204 to the scan line 1202 or vice versa).

Figure 13:
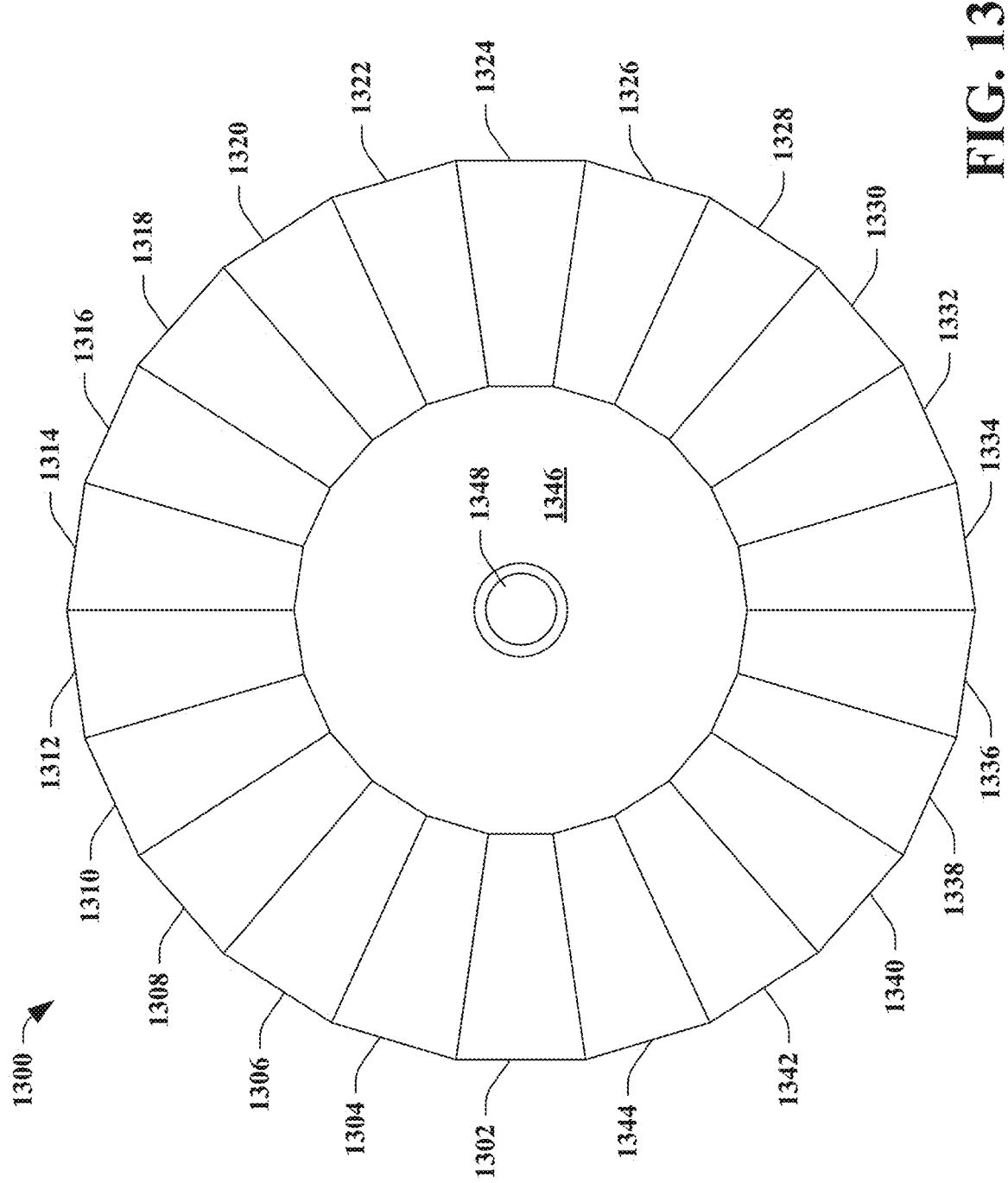
FIG. 13 illustrates a top view of yet another exemplary polygon scanning mirror of a lidar sensor system.

Turning to FIG. 13, illustrated is a top view of another exemplary polygon scanning mirror 1300 (e.g., the polygon scanning mirror 304). The polygon scanning mirror 1300 includes 22 planar optical reflective surfaces 1302-1344. Moreover, the polygon scanning mirror 1300 includes a top surface 1346, with an aperture 1348 that is formed through the top surface 1346. The aperture 1348 passes through the polygon scanning mirror 1300 along an axis of rotation. Thus, a shaft can be positioned through the aperture 1348 to enable the polygon scanning mirror 1300 to rotate about the axis of rotation.

Similar to the polygon scanning mirror 400, a bottom surface of the polygon scanning mirror 1300 is larger than the top surface 1346 of the polygon scanning mirror 1300. The axis of rotation of the polygon scanning mirror 1300 can be centered at a centroid of the bottom surface of the polygon scanning mirror 1300. The planar optical reflective surfaces 1302-1344 can be oriented at a common angle relative to the axis of rotation (e.g., 45 degrees with respect to normal).

Figure 14:
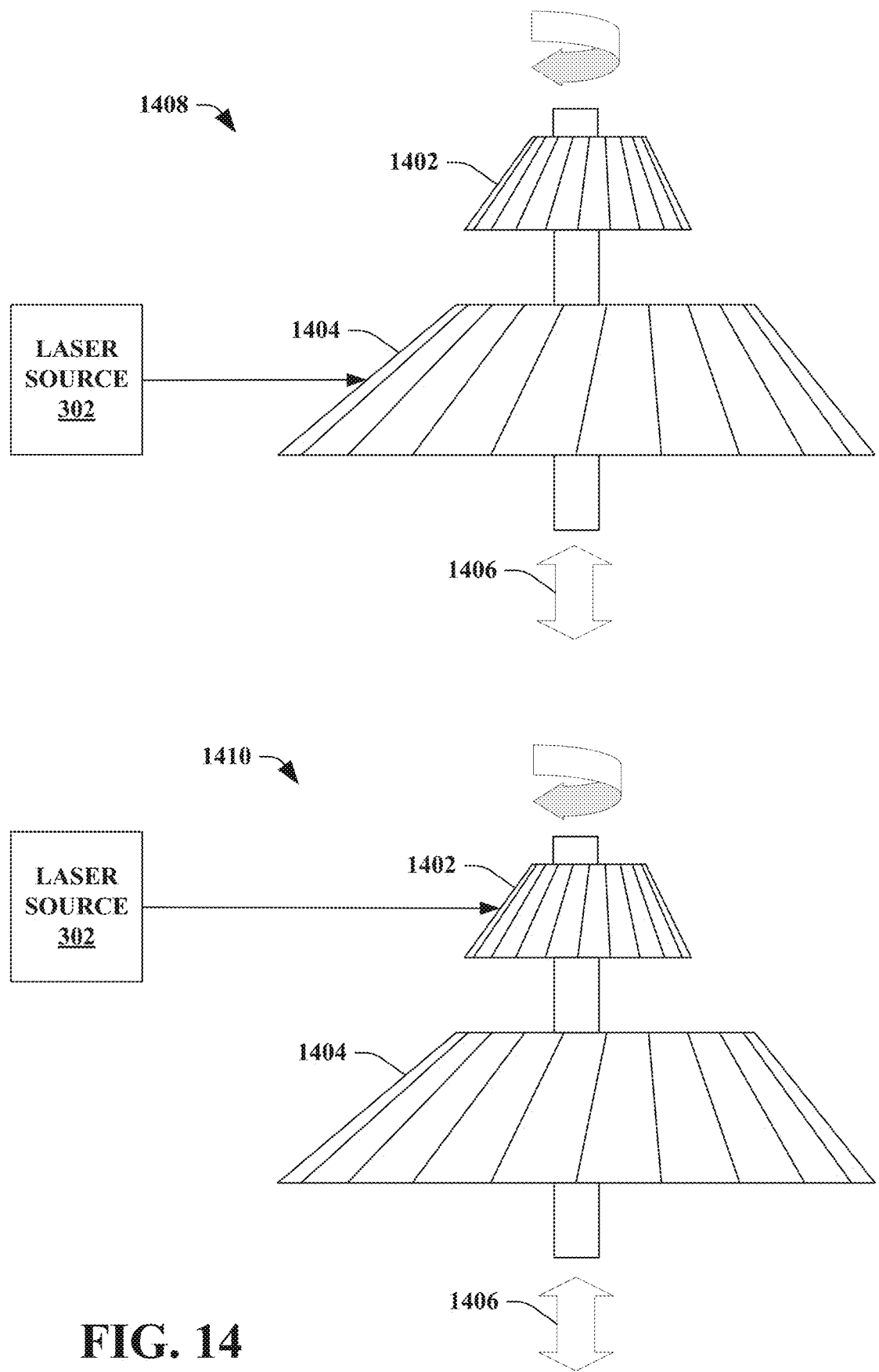
FIG. 14 illustrates an exemplary lidar sensor system that includes two polygon scanning mirrors.

With reference to FIG. 14, illustrated is an exemplary lidar sensor system that includes two polygon scanning mirrors 1402 and 1404. The polygon scanning mirrors can be substantially similar to other polygon scanning mirrors described herein; however, the claimed subject matter is not so limited. Further, it is contemplated that the polygon scanning mirrors 1402-1404 differ from one another (e.g., different sizes, different numbers of planar optical reflective surfaces, different orientations of planar optical reflective surfaces). The polygon scanning mirrors 1402-1404 can be linearly moved along the axis of rotation to align a particular one of the polygon scanning mirrors 1402-1404 with the laser source 302 at a given time. Thus, the lidar sensor system can switch between a scan pattern corresponding to the polygon scanning mirror 1402 and a scan pattern corresponding to the polygon scanning mirror 1404 by moving the polygon scanning mirrors 1402-1404 linearly in a direction 1406.

For instance, as shown at 1408, the laser source 302 can be aligned with the polygon scanning mirror 1404. At a differing time, the laser source 302 can be aligned with the polygon scanning mirror 1402 as shown at 1410.

According to an illustration, the controller 312 can switch between the polygon scanning mirrors 1402-1404 depending on a desired field of view or scan line density. Following this illustration, a polygon scanning mirror providing a wider field of view can be utilized. When a potential object of interest is detected in a part of the field of view, the controller 312 can switch to the other polygon scanning mirror which can provide a scan with denser scan lines. Yet, the claimed subject matter is not so limited.

Reference is now generally made to the polygon scanning mirrors described herein (e.g., the polygon scanning mirror 304, the polygon scanning mirror 400, the polygon scanning mirror 1100, the polygon scanning mirror 1300, the polygon scanning mirrors 1402-1404). Various orientations of the planar optical reflective surfaces in a polygon scanning mirror, a number of the planar optical reflective surfaces included in a polygon scanning mirror, sizes of the planar optical reflective surfaces, and angular velocity at which the polygon scanning mirror is rotated can be based on various factors. Such factors can include a total field of view (e.g., vertical and horizontal field angles (in the azimuth and elevation directions)), a lidar point cloud frame rate (e.g., a rate at which a single field of view frame is to occur), density of scan lines, and a diameter of the outgoing optical signal (e.g., outgoing beam diameter, aperture).

According to various embodiments, a lidar sensor system with the polygon scanning mirror can provide enhanced reliability (lower failure rate) compared to a conventional lidar sensor system that includes a MEMS mirror (e.g., single axis rotation can be more reliable than MEMS mirrors that have multiple degrees of freedom). Moreover, the polygon scanning mirror can have an increased lifetime compared to a conventional MEMS mirror (due to the rotary motion mechanism that can be utilized). Moreover, the lidar sensor system with the polygon scanning mirror can provide a relatively high resonant mode frequency, which can mitigate motion jitter. Further, a control system (e.g., the controller 312) can be simpler than a control system used for a MEMS mirror of a lidar sensor system.

Figure 15:
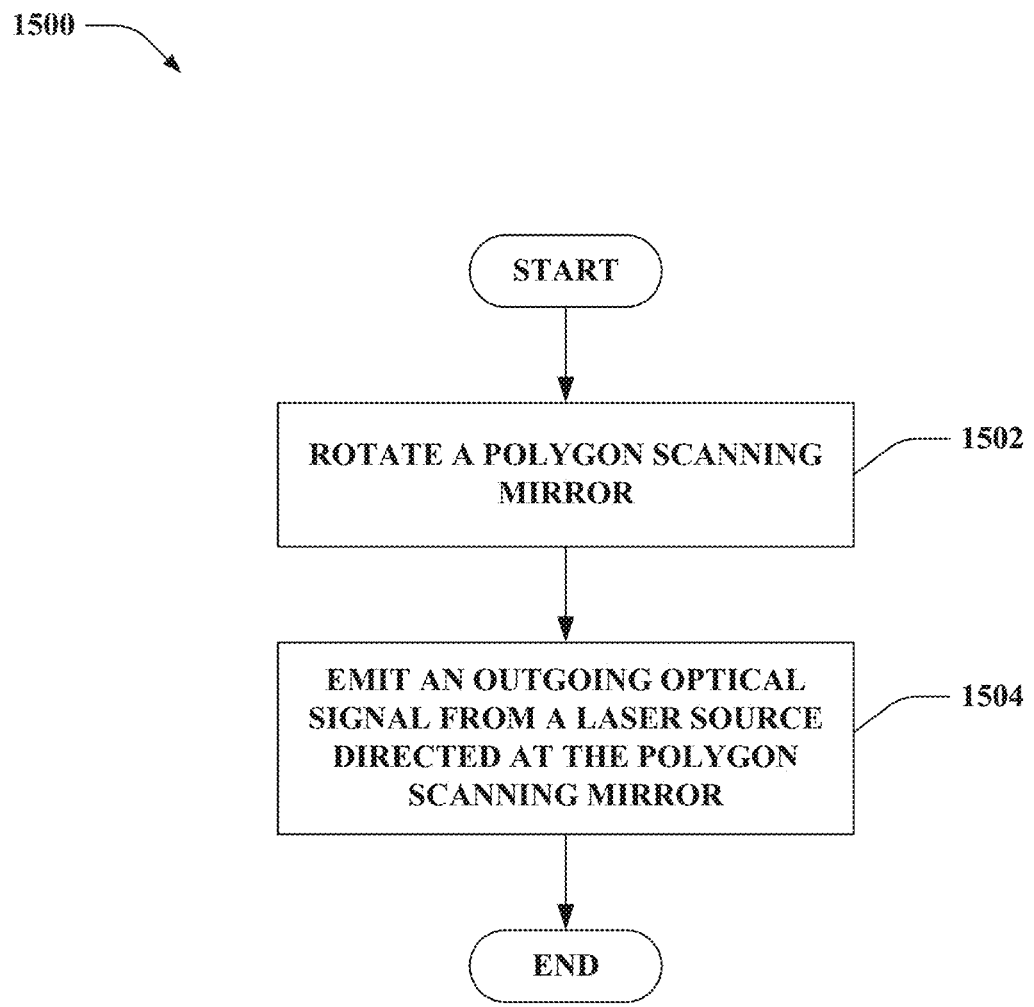
FIG. 15 is a flow diagram that illustrates an exemplary methodology of operating a lidar sensor system that includes a polygon scanning mirror.

FIG. 15 illustrates an exemplary methodology related to operating a lidar sensor system that includes a polygon scanning mirror. While the methodology is shown and described as being a series of acts that are performed in a sequence, it is to be understood and appreciated that the methodology is not limited by the order of the sequence. For example, some acts can occur in a different order than what is described herein. In addition, an act can occur concurrently with another act. Further, in some instances, not all acts may be required to implement the methodology described herein.

FIG. 15 illustrates a methodology 1500 of operating a lidar sensor system that includes a polygon scanning mirror. At 1502, a polygon scanning mirror of the lidar sensor system can be rotated about an axis of rotation. The polygon scanning mirror can include planar optical reflective surfaces around a circumference of the polygon scanning mirror. Moreover, the planar optical reflective surfaces can be oriented at angles offset relative to the axis of rotation. At 1504, an outgoing optical signal can be emitted from a laser source of the lidar sensor system directed at the polygon scanning mirror. The outgoing optical signal can be reflected by the planar optical reflective surfaces as the polygon scanning mirror is rotated, causing the outgoing optical signal to be scanned across a field of view according to a scan pattern.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A lidar sensor system, comprising:
    a laser source configured to emit an outgoing optical signal; and
    a polygon scanning mirror configured to scan the outgoing optical signal from the laser source over a field of view in an environment of the lidar sensor system as the polygon scanning mirror rotates about an axis of rotation, the polygon scanning mirror comprises:
        a top surface having a geometric center;
        a bottom surface having a geometric center; and
        planar optical reflective surfaces around a circumference of the polygon scanning mirror, the planar optical reflective surfaces being between the top surface and the bottom surface, the planar optical reflective surfaces being oriented at angles offset relative to the axis of rotation;
    a differing polygon scanning mirror configured to rotate about the axis of rotation, the differing polygon scanning mirror comprises differing planar optical reflective surfaces around a circumference of the differing polygon scanning mirror, the differing planar optical reflective surfaces being oriented at angles offset relative to the axis of rotation, wherein a number of the planar optical reflective surfaces of the polygon scanning mirror differs from a number of the differing planar optical reflective surfaces of the differing scanning mirror;
    wherein the axis of rotation is centered at the geometric center of the bottom surface; and
    wherein the geometric center of the top surface is offset from the geometric center of the bottom surface.

2. The lidar sensor system of claim 1, wherein at least two of the planar optical reflective surfaces are oriented at differing angles relative to the axis of rotation.

3. The lidar sensor system of claim 1, wherein at least two of the planar optical reflective surfaces are oriented at a common angle relative to the axis of rotation.

4. The lidar sensor system of claim 1, further comprising:
    an actuator configured to cause the polygon scanning mirror to rotate about the axis of rotation; and
    a controller configured to control the actuator such that rotation of the polygon scanning mirror about the axis of rotation is controlled.

5. The lidar sensor system of claim 4, wherein the controller controls an angular velocity at which the polygon scanning mirror is rotated about the axis of rotation by the actuator.

6. The lidar sensor system of claim 4, wherein the controller controls a direction of rotation of the polygon scanning mirror about the axis of rotation caused by the actuator.

7. The lidar sensor system of claim 4, wherein the controller is further configured to control the actuator to linearly move the polygon scanning mirror along the axis of rotation.

8. The lidar sensor system of claim 1, wherein the planar optical reflective surfaces are oriented at incrementally increasing angles relative to the axis of rotation around the circumference of the polygon scanning mirror.

9. The lidar sensor system of claim 1, wherein the laser source is configured to direct the outgoing optical signal towards the axis of rotation.

10. The lidar sensor system of claim 1, wherein the laser source is configured to direct the outgoing optical signal in a direction parallel to the top surface.

11. The lidar sensor system of claim 1,
    wherein one of the polygon scanning mirror or the differing polygon scanning mirror is aligned with the laser source during a given time period.

12. The lidar sensor system of claim 11, wherein the polygon scanning mirror and the differing polygon scanning mirror are configured to scan the outgoing optical signal into the environment with differing scan patterns.

13. The lidar sensor system of claim 11, wherein the polygon scanning mirror and the differing polygon scanning mirror are linearly moved along the axis of rotation relative to the laser source to cause the one of the polygon scanning mirror or the differing polygon scanning mirror to be aligned with the laser source during the given time period.

14. The lidar sensor system of claim 11, wherein a size of the polygon scanning mirror differs from a size of the differing polygon scanning mirror.

15. The lidar sensor system of claim 11, wherein orientations of the planar optical reflective surfaces differ from orientations of the differing planar optical reflective surfaces.

16. A method of operating a lidar sensor system, comprising:
    rotating a polygon scanning mirror of the lidar sensor system about an axis of rotation, the polygon scanning mirror comprises:
        a top surface having a geometric center;
        a bottom surface having a geometric center; and
        planar optical reflective surfaces around a circumference of the polygon scanning mirror, the planar optical reflective surfaces being between the top surface and the bottom surface, the planar optical reflective surfaces being oriented at angles offset relative to the axis of rotation;
    a differing polygon scanning mirror configured to rotate about the axis of rotation, the differing polygon scanning mirror comprises differing planar optical reflective surfaces around a circumference of the differing polygon scanning mirror, the differing planar optical reflective surfaces being oriented at angles offset relative to the axis of rotation, wherein a number of the planar optical reflective surfaces of the polygon scanning mirror differs from a number of the differing planar optical reflective surfaces of the differing scanning mirror wherein the axis of rotation is centered at the geometric center of the bottom surface; and wherein the geometric center of the top surface is offset from the geometric center of the bottom surface; and emitting an outgoing optical signal from a laser source of the lidar sensor system directed at the polygon scanning mirror, wherein the outgoing optical signal is reflected by the planar optical reflective surfaces as the polygon scanning mirror is rotated such that the outgoing optical signal is scanned across a field of view along a scan pattern.

17. The lidar sensor system of claim 1, wherein a returned optical signal is returned to the polygon scanning mirror, and wherein the outgoing optical signal is emitted into the environment and reflects off a target in the environment such that at least a portion of the output optical signal is returned to the polygon scanning mirror as the returned optical signal.

18. A lidar sensor system, comprising:
- a laser source configured to emit an outgoing optical signal;
- a polygon scanning mirror configured to rotate about an axis of rotation, the polygon scanning mirror comprises:
  - a top surface;
  - a bottom surface; and
  - planar optical reflective surfaces around a circumference of the polygon scanning mirror, the planar optical reflective surfaces being between the top surface and the bottom surface of the polygon scanning mirror, the planar optical reflective surfaces being oriented at angles offset relative to the axis of rotation; and
- a differing polygon scanning mirror configured to rotate about the axis of rotation, the differing polygon scanning mirror comprises:
  - a differing top surface;
  - a differing bottom surface; and
  - differing planar optical reflective surfaces around a circumference of the differing polygon scanning mirror, the differing planar optical reflective surfaces being between the differing top surface and the differing bottom surface of the differing polygon scanning mirror, the differing planar optical reflective surfaces being oriented at angles offset relative to the axis of rotation;

wherein one of the polygon scanning mirror or the differing polygon scanning mirror is aligned with the laser source during a given time period to scan the outgoing optical signal from the laser source over a field of view in an environment of the lidar sensor system; and wherein a number of the planar optical reflective surfaces of the polygon scanning mirror differs from a number of the differing planar optical reflective surfaces of the differing scanning mirror.

19. The lidar sensor system of claim 18, wherein the polygon scanning mirror and the differing polygon scanning mirror are linearly moved along the axis of rotation relative to the laser source to cause the one of the polygon scanning mirror or the differing polygon scanning mirror to be aligned with the laser source during the given time period.

* * * * *